United States Patent [19]
Slavin et al.

[11] 3,788,752
[45] Jan. 29, 1974

[54] GAS FLOW CONTROLLER FOR A HEATED SAMPLE CELL

[75] Inventors: Sabina Slavin, Ridgefield; Herbert L. Kahn, Westport, both of Conn.

[73] Assignee: The Perkin-Elmer Corporation, Norwalk, Conn.

[22] Filed: Mar. 3, 1972

[21] Appl. No.: 231,578

[52] U.S. Cl.................... 356/36, 356/85, 356/244
[51] Int. Cl. ............................................. G01j 3/02
[58] Field of Search.................... 356/36, 74, 85–87, 356/96, 97, 244

[56] References Cited
OTHER PUBLICATIONS

Manning et al., Atomic Absorption Newsletter, Vol. 9, No. 3, May–June 1970, pages 65–70.
West et al., Analytica Chimica Acta, Vol. 45, March 1969, pages 27–41.
Katskov et al., Industra Lab. (U.S.A.), Vol. 35, No. 8, August 1969, pages 1,202–1,204.

Primary Examiner—John K. Corbin
Assistant Examiner—F. L. Evans
Attorney, Agent, or Firm—Daniel R. Levinson

[57] ABSTRACT

A gas flow controller controls the flow of inert purging gas to a heated graphite tube sample cell. The graphite tube is electrically heated to atomize the sample so that an atomic absorption spectrophotometric measurement can be made of the sample. The purge gas is applied to the sample cell to keep oxygen out of the graphite tube to prevent burning of the tube during the heating cycle. The gas flow controller includes a valve that exhibits first and second operating positions for providing respectively a first flowpath to couple the purging gas to the sample cell, and a second flowpath to divert the gas away from the sample cell. A programmer is included in the controller to program the heating of the sample cell to a first level to dry the sample in the sample cell during a drying portion of the heating cycle. The sample cell is heated to a second level to char the sample and then to a third higher level to atomize the sample during an atomizing portion of the heating cycle. The programmer is coupled to activate the valve to switch the valve from operating in its first position during the drying and charring portions of the heating cycle to operate in its second position at the beginning of the atomizing portion of the cycle. Thus the purge gas is diverted away from the sample cell during the atomizing portion of the heating cycle so that the atomized sample is not rapidly swept out of the sample cell. Consequently more sensitive atomic absorption measurements may be made.

7 Claims, 3 Drawing Figures

GAS FLOW CONTROLLER FOR A HEATED SAMPLE CELL

BACKGROUND OF THE INVENTION

In typical atomic absorption spectrophotometers, a sample in the form of a solution is nebulized to form a vapor and the vapor is atomized in a flame so that an atomic absorption spectrophotometric measurement can be made. Since presently available nebulizers are less than 15 percent efficient in forming vaporized droplets suitable for atomization, and the sample passes rapidly through the flame, it is difficult to determine accurately small concentrations of metal in a sample unless there has been a sample pre-concentration before the measurement is made. Recently there have become commercially available heated sample cells of the graphite tube type. In such graphite tube sample cells, the sample may be either in the form of a solid or a liquid. The sample is first placed in a cylindrical graphite tube and the tube is electrically heated to successively higher levels. This is accomplished by applying successively higher currents to the graphite tube to dry the sample first, then to char the sample and finally to atomize the sample. For a given amount of sample the graphite tube furnace provides a much higher efficiency than that exhibited by a flame burner. However, to accomplish atomization of the sample, it is necessary to heat the graphite tube to incandescence. Consequently the graphite tube is subject to oxidation. A purging gas is therefore applied to the sample cell to keep out the oxygen (in the air) in the graphite tube to prevent the burning of the graphite tube. However, the effect of such a purge gas is not only to sweep out the oxygen but also the atomized sample. Consequently even though a graphite tube sample cell is relatively efficient in atomizing a sample, the time in which such an atomized sample is available for an atomic absorbance measurement is relatively short.

SUMMARY OF THE INVENTION

A gas flow controller controls purge gas flow to a sample cell to lengthen the time in which atomic absorption measurements may be made by preventing the sweeping out of an atomized sample by the purge gas while such measurements are being made. The controller includes a valve having first and second operating positions that provide respectively a first flowpath for coupling the purge gas to the sample cell and a second flowpath for diverting the purge gas away from the sample cell. A programmer is included to program the heating of the sample cell to a first heating level to dry the sample and to a higher level to atomize the sample. The programmer is coupled to actuate the valve to operate in the first position during the drying period of the sample and in the second position during the atomizing period of the sample.

GENERAL DESCRIPTION

Figure 1:
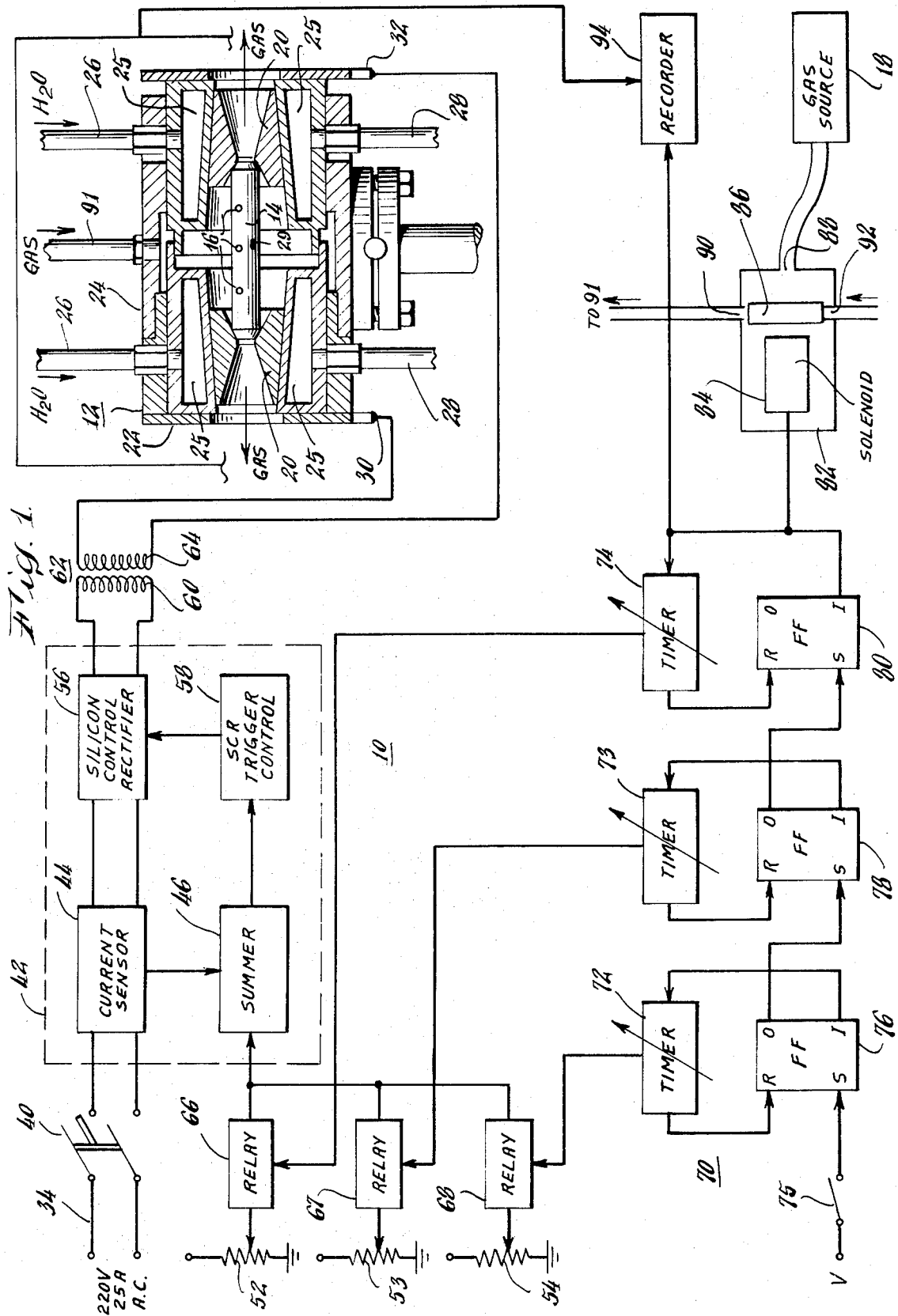
FIG. 1 is a schematic block diagram of a gas flow controller for controlling the purge gas that is supplied to a graphite tube sample cell.

An atomic absorption spectrophotometric system 10 that embodies the invention includes a graphite tube sample cell 12 that is mounted in an atomic absorption spectrophotometer. The atomic absorption spectrophotometer is shown only in outline form in FIG. 1 and may, for example, comprise a Model 403 Atomic Absorption Spectrophotometer manufactured by The Perkin-Elmer Corporation of Norwalk, Connecticut. The sample cell 12 includes a cylindrically shaped graphite tube 14 having a plurality of apertures 16 for permitting a sample to be inserted into the tube as well as to permit purging gas from a source 18 to be applied to purge the tube 14. The tube 14 is centrally mounted in the sample cell 12 and held by a pair of annular graphite electrodes 20. The electrodes 20 are force fitted into either end of bipart metal housings 22 and 24. The metal housings 22 and 24 are insulated from each other at the part therebetween to prevent short-circuiting the graphite tube 14. Each metal housing 22 and 24 includes a hollow annulus water jacket 25 that surrounds the electrodes 20 to permit water to cool the sample cell 12. The water flows into the water jackets 25 through water housing connections 26 and out of the water jackets 25 through connections 28. Electrical connectors 30 and 32 are coupled to the metal housing 22 and 24 respectively to apply electrical current to the electrodes 20 and hence through the graphite tube 14 to electrically heat the tube 14 to atomize a sample 29 deposited therein. Light from a source (not shown) that may for example comprise a hollow cathode lamp containing a small amount of the element being determined in the sample 29 is directed through the axial length of the tube 14 to make an atomic absorption measurement of the sample 29.

The current to heat the tube 14 is derived from a 220 volt, 25 ampere alternating current power line 34 that is coupled through a switch 40 to a current regulator circuit 42. The current regulator circuit 42 determines the amount of current applied to the graphite tube 14. The current regulator 42 includes a current sensing transformer 44 that is inductively coupled to the input power line 34. The amount of current flowing in the input power line 34 is detected by the sensor 44 and applied to a summing circuit 46. The summer 46 algebraically adds the current level sensed by the sensor 44 with a sequence of signals exhibited by potentiometers 52 through 54 to provide an output that acutates a silicon controlled rectifier (SCR) trigger circuit 58 that controls the triggering of an SCR regulator circuit 56. The SCR regulator circuit 56 when fired applies the current carried by the input line 34 to the primary winding 60 of a current step-up transformer 62. The transformer 62 may for example step up the 25 ampere current level from the input line 34 to 250 amperes. The secondary winding 64 of the transformer 62 is coupled to apply this current to the terminals 30 and 32 of the graphite cell.

The level of current passed through the regulator circuit 42 is determined by the settings of the potentiometers 52 through 54 which are initially set by hand by an operator of the system 10. The potentiometers 52, 53 and 54 are each coupled between a source of potential V and a point of reference, such as circuit ground, in the system 10. The setting of the potentiometer 54 determines the amount of current applied to the graphite tube 14 that is necessary to dry the sample 29. The setting of the potentiometer 53 provides the amount of current necessary to heat the graphite tube 14 to a level that causes the sample 29 to ash. The ashing portion of the heating cycle is not always necessary. The potentiometer 52 provides the amount of heating current necessary to atomize the sample 29 in the graphite tube 14. The potentiometers 52, 53 and 54 are respectively coupled to the summer circuit 48 by means of relays 66, 67, and 68. The relays 66, 67 and 68 are actuated to close and then subsequently to open through the operation of a programmer 70. The programmer 70 includes a variable clock timer 72 that is coupled to actuate relay 68 when the timer 72 is actuated. The timer 72 is made variable so that an operator of the system 10 can set the duration of the timing cycle in the timer 72 such that the relay 68 is closed long enough to cause enough current of the proper root mean square level to be applied to the graphite tube 14 to dry the sample 29.

The heating cycle is initiated by closing a switch 75 that applies a signal from a potential source $V_1$ to set a flip-flop 76. The setting of the flip-flop 76 provides an output signal from the "1" output terminal thereof that is coupled to start the operation of the timing clock in the timer 72. The timer 72 therefore actuates the relay 68 to apply the signal level preset in the potentiometer 54 to the summer 46. At the end of the timing cycle preset in the variable timer 72, the timer 72 produces an output signal that resets the flip-flop 76 and de-energizes and opens the relay 68. The "0" output signal of the flip-flop 76 is coupled to set a flip-flop 78. The "1" output terminal of the flip-flop 78 is coupled to apply an output signal to start a second timer 73. The second timer 73 closes relay 67 for the predetermined time preset therein by an operator of the system 10. At the expiration of the timing cycle of the timer 73, the timer 73 produces an output signal that is coupled to reset the flip-flop 78. The flip-flop 78 when reset is coupled to set a flip-flop 80. The flip-flop 80 applies an actuating signal to the last timer, 74 in the programmer 70. The timer 74 determines the length of time the relay 66 is closed to apply an atomizing current to the graphite tube 14.

The programmer 70 is also coupled to valve means 82. The valve means 82 exhibits two operating positions, a first position wherein purge gas from the gas source 18 is coupled to the sample cell 12 and a second position wherein the purge gas from the source 18 is diverted away from the sample cell 12 and exhausted into the atmosphere. The valve means 82 comprises a solenoid actuated valve wherein a solenoid 84 is energized by the output signal derived from the "1" output terminal of the flip-flop 80 in the programmer 70 when the flip-flop 80 is set. The energization of the solenoid 84 translates a plunger 86 so as to close a normally open outlet aperture 90 and to open a normally closed aperture 92. Thus the plunger 86 in its two operating positions defines two gas flowpaths. A first gas flowpath steers gas from the gas source 18 through an inlet aperture 88 of the valve means 82 through the normally open outlet 90 to an inlet gas nipple 91 in the sample cell 12. The plunger 86 when translated to its second position defines the second gas flowpath wherein gas from the source 18 flows into the inlet aperture 88 and is then evacuated through the aperture 92 to the atmosphere. The gas derived from the source 18 is an inert gas, such as nitrogen or argon, and prevents the oxidation of the tube 14 when incandescent. The purge gas after flowing into the graphite tube 14 through the apertures 16 is evacuated to the atmosphere through the open ends of the tube 18 and housings 22 and 24.

The flip-flop 80 in the programmer 70 is coupled to initiate the recording of the atomic absorption measurement made in the atomic absorption spectrophometer 12. Consequently the flip-flop 80 is coupled to actuate a recorder 94 which is in turn coupled to record the absorbance measurements made during the atomization portion of the heating cycle of the graphite tube furnace 12.

OPERATION

In operating the atomic absorption spectrophotometric system 10, an operator adjusts the temperatures to which the graphite tube 14 are to be heated. The temperatures are preset by adjusting the potentiometers 52 through 54. The potentiometer 54 controls the amount of current applied to the graphite tube 14 during the drying portion of the heating cycle. Therefore this potentiometer is set to apply a low level signal to the summer 46 to cause the graphite tube 14 to be heated to about 100° C. The potentiometer 53 controls the amount of current applied to the graphite tube 14 during the ashing or charring portion of the heating cycle. Therefore this potentiometer is preset to apply an intermediate level signal to the summer 46 to cause the graphite tube 14 to be heated to about 1,000° C. Finally the potentiometer 52 determines the amount of current applied to the graphite tube 14 during the atomization portion of the heating cycle. Consequently a high level signal is applied to the summer 46 to cause the graphite tube 14 to be heated to about up to 2,700° C. The operator then places a sample, which may for example comprise a solid, into the graphite tube 14.

The programmer 70 determines the duration of each portion of the heating cycle. Consequently the timer 72 is adjusted to provide a clock cycle of from zero seconds to 2 minutes for the drying portion of the heating cycle. Similarly the timers 73 and 74 are adjusted for the times necessary for the sample to first ash and then be atomized in the tube 14. The ashing time may vary from zero seconds to 20 minutes and the atomization time may vary from zero to 30 seconds depending on the sample to be measured. It is to be appreciated that calibration tables for various sample materials are provided such that the correct settings may be made on the potentiometers 52 through 54 as well as on the timers 72 through 74.

Once these preliminary settings have been made by the operator in the system 10, the switches 40 and 75 are closed to apply power to the graphite tube 14 as well as to initiate the programmer 70. The closing of the switch 75 sets the flip-flop 76 to produce an output signal from the "1" output terminal thereof. This output signal initiates the timer 72 to start the drying portion of the heating cycle. The timer 72 produces an output signal that closes the relay 68 to apply a drying signal to the summer 46. The power flowing in the power line 34 is sensed in the current sensor 44 and is algebraically summed with the output signal of the potentiometer 54 to provide a feedback control signal that controls the trigger control circuit 58 of the SCR circuit 56 to provide the correct firing time for the SCR circuit 56. The SCR circuit 56 is turned on for a relatively small portion of the alternating current cycle to produce the lowest level of current in the primary winding of the step-up transformer 62 during the heating cycle. It is to be appreciated that the current regulator 42 actually goes through a series of feedback steps wherein the summer 46 causes incremental adjustments of the firing of the SCR circuit 56 until the output of the summer 46 is stabilized. Thereupon the root-mean-square current applied to the graphite tube 14 remains substantially constant. At the end of the timing cycle required for drying the sample in the tube 14, the timer 72 de-energizes the relay 68 and hence disconnects the potentiometer 54 from the summer 46. The timer also relay the flip-flop 76, and the output signal derived from the "0" output terminal thereof is coupled to set the second flip-flop 78 in the programmer 70 to initiate the ashing portion of the heating cycle.

This flip-flop 78 in starting the clock in the timer 73 initiates the ashing portion of the heating cycle. The timer 73 produces an output signal that energizes the relay 67 and applies an intermediate "ashing" signal level derived from the potentiometer 53 to the summer 46. This "ashing" signal level is higher than the "drying" signal level and consequently the current regulator 42 produces a higher output current that is aplied to graphite tube 14.

Figure 2:
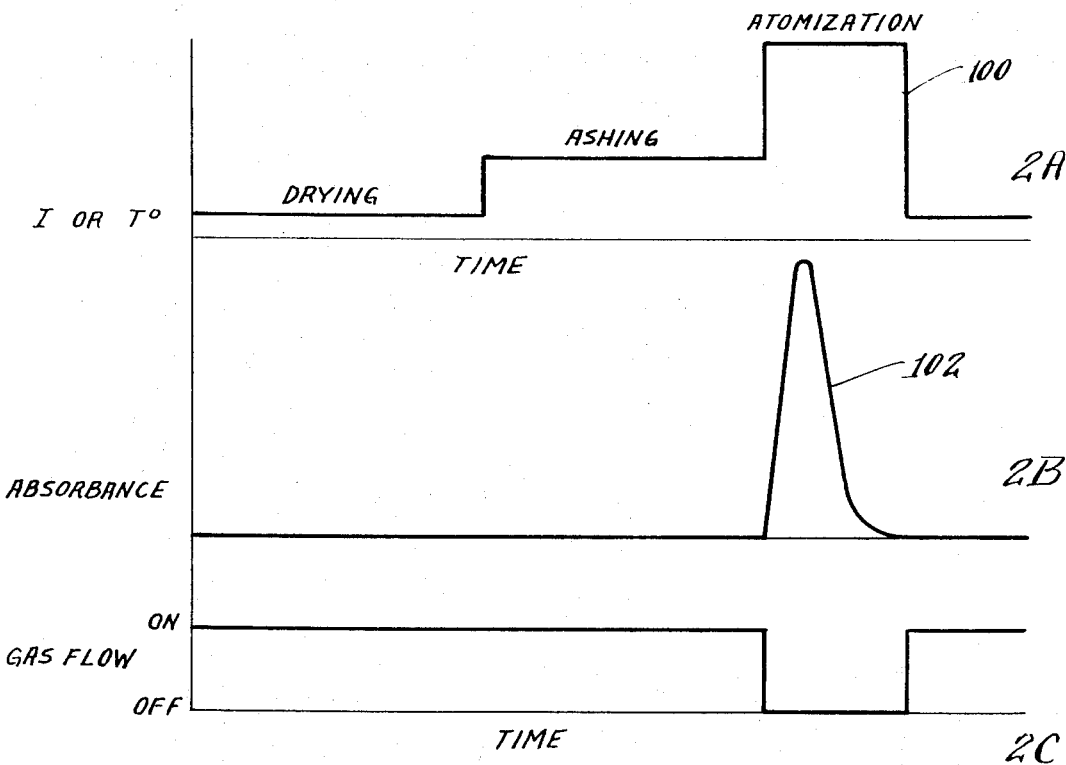
FIG. 2 is a graphical representation of the heating cycle of the graphite tube sample cell of FIG. 1.

As shown by the temperature or current curve 100 in FIG. 2, there occurs a digital step increase at the end of the drying cycle when the system switches to the ashing portion of the cycle. It is to be noted that during the drying and ashing portions of the heating cycle no absorbance measurements are being made, as shown in FIG. 2b. However the purge gas from the source 18 is being continuously applied to the graphite tube 14, as shown by FIG. 2c. The purge gas during these portions of the heating cycle prevents the graphite tube 14 from being oxidzied by continuously sweeping out all the air in the tube 14. The purge gas derived from the gas source 18 is under pressure and consequently flows through the inlet aperture 88 of the valve 82 and out the outlet aperture 90 into the inlet nipple 91 of the sample cell 12. The gas then flows through the apertures 16 into the graphite tube 14 and out the open ends of the tube, At the end of the ashing portion of the heating cycle, the timer 73 de-energizes the relay 67 and disconnects the potentiometer 53 from the summer 46. The timer 73 also resets the flip-flop 78 to produce an output signal that sets the flip-flop 80.

The setting of the flip-flop 80 initiates the atomization portion of the heating cycle. Consequently the output signal from the "1" output terminal of the flip-flop 80 is applied to energize the solenoid 84 in the valve 82. The energization of the solenoid 84 translates the plunger 86 from its first operating position to its second operation position. Consequently the first flowpath through the outlet aperture 90 is blocked and the second flowpath through the aperture 92 is opened. The purging gas is therefore diverted away from sample cell 12 and released into the atmosphere surrounding the system 10. Since the purge gas is an inert gas and may be either nitrogen or argon, the gas is harmless when evacuated into the atmosphere.

The "1" signal of the flip-flop 80 also initiates the recorder 94 to record the atomic absorption spectrometric measurement made during this time. Finally, the signal from the flip-flop 80 also initiates the timer 74 to time the atomization portion of the heating cycle. The timer therefore closes the relay 66 to apply the high at-omization signal level from the potentiometer 52 to the summer 46. Consequently a high level current is applied to the graphite tube 14 which causes this tube to incandesce and atomize the element contained in the tube. With the purging gas being disconnected from the sample cell 12 the atomized element is not swept out of the graphite tube 14. Consequently the atomized element remains in the tube 14 sufficiently long to provide a signficantly better absorbance measurement. Furthermore the length of time during the atomization portion of the heating cycle is no greater than 1/2 minute and consequently the graphite tube 12 does not have time to absorb oxygen and burn. At the end of the atomization portion of the heating cycle, the solenoid 84 is de-energized by the resetting of the flip-flop 80 by the timer 74. Thus the purge gas is once again directed into the graphite tube 14.

Figure 3:
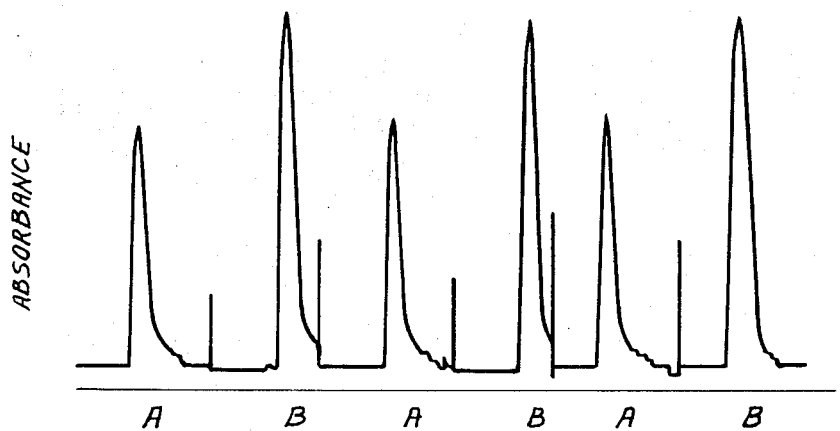
FIG. 3 is a graphical representation of absorbance measurements made in a sample cell with and without the controller of FIG. 1.

In FIG. 3 there is shown a series of curves that illustrate the significant increase in sensitivity of the sample cell 12 when a gas flow controller is utilized. In FIG. 3 the curves labelled "A" are absorbance measurements of two nanograms, ($g \times 10^{-9}$) of copper recorded while purging gas continuously flowed through the graphite tube during the absorbance measurement. In FIG. 3 the curves labelled "B" are absorbance measurements taken with the same amount of sample but with the purge gas being turned off under control of the controller 10. It is to be noted that the curves "B" are significantly higher than the curves "A". One consequence of this enhanced absorbance measurement is that a lesser amount of sample may be utilized in the system 10 with equivalent or better results.

Thus in accordance with the invention a gas flow controller is provided that enhances the sensitivity of an electrically heated graphite tube sample cell by controlling the flow of purging gas to the graphite tube during the heating cycle. By diverting the purging gas away from the sample cell during the time a spectrophotometric measurement is made, the atomized sample remains in the tube for a longer period of time providing an enhanced absorbance measurement.

What is claimed is:

1. A controller for controlling purge gas flow to a sample cell having open communication with the atmosphere that is heated during a heating cycle to a first low level to produce a drying of a sample and to a second high level to produce an atomization of said sample so as to permit an atomic absorption spectrophotometric measurement thereof, comprising in combination valve means having first and second operating states for providing respectively a first flowpath for coupling said purge gas to said sample cell and a second flowpath for effectively decoupling said purge gas from said sample cell, and programmer means coupled to said valve means for actuating said valve means to operate in said first state during the drying period of said heating cycle and in the second state during the atomization period of said heating cycle so as to lengthen the time of said atomized sample in said sample cell during said spectrophotometric measurement.

2. The combination in accordance with claim 1 wherein:

said purge gas comprises an inert gas that prevents oxidation of said sample cell.

3. The combination in accordance with claim 2 wherein:
said sample cell comprises a graphite tube and wherein said graphite tube is electrically heated by a low current to produce said drying period and by a high current to produce said atomization period of said heating cycle.

4. The combination in accordance with claim 3 wherein said programmer means includes a plurality of timers, one for each of said periods of said heating cycle.

5. The combination in accordance with claim 4 wherein:
said valve means comprises a solenoid actuated valve.

6. The combination in accordance with claim 5 wherein:
one of said timers is coupled to activate said solenoid actuated valve during the atomization portion of said heating cycle.

7. The method of operating an electrically heated graphite sample cell having open ends comprising the steps of:
heating said sample cell to dry a sample contained therein,
applying a purge gas to said sample cell during said drying period,
increasing the current applied to said sample cell to atomize said sample,
diverting said purge gas away from said sample cell during said atomization period to prevent said atomized sample from being swept out of said sample cell, and
making an atomic absorption spectrophotometric measurement of said sample during said atomization period of said heating cycle.

* * * * *